(12) United States Patent
Baldwin et al.

(10) Patent No.: US 11,321,494 B2
(45) Date of Patent: May 3, 2022

(54) PLATFORM CONFIGURATIONS

(71) Applicant: HEWLETT-PACKARD DEVELOPMENT COMPANY, L.P., Spring, TX (US)

(72) Inventors: Adrian Baldwin, Bristol (GB); James Robert Waldron, Spring, TX (US); David Plaquin, Bristol (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/771,181

(22) PCT Filed: Mar. 12, 2018

(86) PCT No.: PCT/US2018/021946
§ 371 (c)(1),
(2) Date: Jun. 9, 2020

(87) PCT Pub. No.: WO2019/177564
PCT Pub. Date: Sep. 19, 2019

(65) Prior Publication Data
US 2021/0182434 A1 Jun. 17, 2021

(51) Int. Cl.
| | |
|---|---|
| *G06F 21/72* | (2013.01) |
| *G06F 21/57* | (2013.01) |
| *H04L 9/08* | (2006.01) |
| *H04L 9/32* | (2006.01) |
| *G06F 9/4401* | (2018.01) |

(52) U.S. Cl.
CPC .............. *G06F 21/72* (2013.01); *G06F 21/57* (2013.01); *H04L 9/0877* (2013.01); *H04L 9/3247* (2013.01); *G06F 9/4401* (2013.01); *G06F 2221/034* (2013.01)

(58) Field of Classification Search
CPC ........ G06F 21/72; G06F 21/57; G06F 9/4401; G06F 2221/034; G06F 21/64; H04L 9/0877; H04L 9/3247
See application file for complete search history.

(56) References Cited

U.S. PATENT DOCUMENTS

| | | | |
|---|---|---|---|
| 7,640,593 B2 | 12/2009 | Tarkkala | |
| 7,711,960 B2 * | 5/2010 | Scarlata | H04L 9/0897 713/182 |
| 8,667,263 B2 * | 3/2014 | Challener | G06F 21/57 713/2 |
| 8,670,568 B2 | 3/2014 | Ibrahim et al. | |
| 9,218,490 B2 | 12/2015 | Wiseman | |
| 9,280,659 B2 | 3/2016 | Rozas et al. | |
| 9,294,282 B1 * | 3/2016 | Potlapally | H04L 9/3242 |
| 9,361,462 B2 * | 6/2016 | Chen | G06F 21/57 |

(Continued)

FOREIGN PATENT DOCUMENTS

TW 201447759 A 12/2014

*Primary Examiner* — Christopher A Revak
(74) *Attorney, Agent, or Firm* — HPI Patent Department

(57) ABSTRACT

In an example, there is provided a method for attesting to a management state of a device platform configuration, based on a signed data structure that represents a device management status and a time-based value from a secure cryptoprocessor of the device. The signed data structure is sent to a management system for validation based on a comparison to the state of the cryptoprocessor at the time of signing the data structure.

15 Claims, 2 Drawing Sheets

(56) References Cited

U.S. PATENT DOCUMENTS

| | | |
|---|---|---|
| 9,594,567 B2 | 3/2017 | O'Rourke et al. |
| 9,690,943 B2 | 6/2017 | Barkelew et al. |
| 2005/0021968 A1 | 1/2005 | Zimmer et al. |
| 2006/0015732 A1 | 1/2006 | Liu |
| 2010/0161998 A1 | 6/2010 | Chen et al. |
| 2012/0151223 A1 | 6/2012 | Conde Marques |
| 2016/0259941 A1 | 9/2016 | Vasudevan et al. |

* cited by examiner

PLATFORM CONFIGURATIONS

BACKGROUND

Management systems of a computing device can be used to configure management data within the platform and below the level of the OS. For example, a System Centre Configuration Manager (SCCM) may reduce the number of protocols being managed between devices and a central management server based on the SCCM which can push policies to devices. An agent on each local device can be used to enforce the policies.

BRIEF DESCRIPTION OF THE DRAWINGS

Various features of certain examples will be apparent from the detailed description which follows, taken in conjunction with the accompanying drawings, which together illustrate, by way of example only, a number of features, wherein.

DETAILED DESCRIPTION

Figure 1:
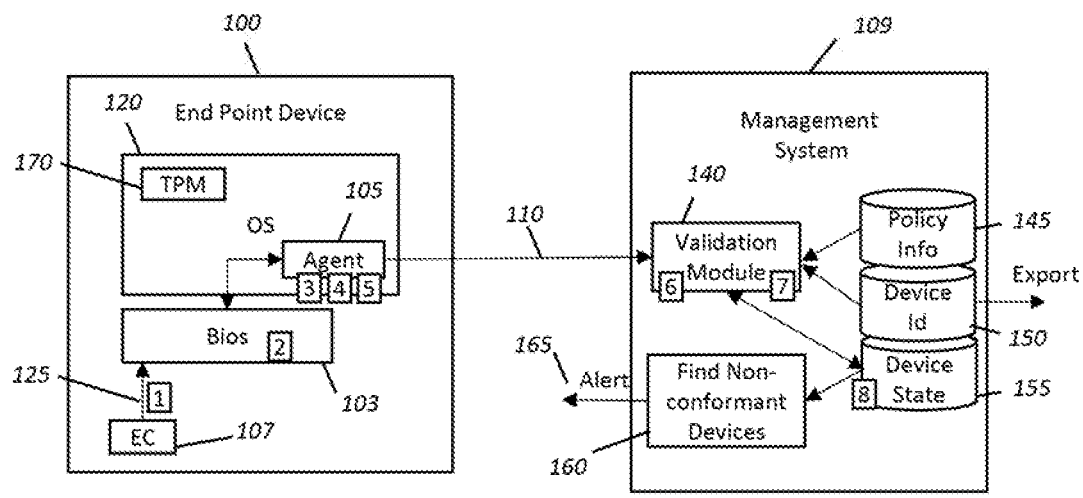
FIG. 1 shows device providing a management system or management server with a trustable management state according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

An authorised management state for a given client device can be stored within an embedded controller (EC) of the local device. A management state or device platform state represents a security state of the device at a particular time or counter value. For example, a management state may describe the state or settings of firmware of the device. Device platform management information may describe a management state or changes to a management state. Changes to this state can be made using a signed statement from a management system with an appropriate counter to ensure freshness of the command. The client device can pick up new policy settings from a distribution point of the management system and then apply the new policy settings locally. An agent running in the operating system (OS) of the device may be used to check and maintain the state of platform-based values. This makes it difficult for the management system to ensure that the signed changes are being enacted since an identity on the platform should be trusted. For example, if the client device were to be subverted then a management agent on the local device could fail to apply policies and report back to management system that the changes were made. The management agent must be trusted to correctly set the policies.

A measurement reflecting loaded modules or components as well as a security state of the computing device can be generated. An attestation service (that can be remote from the device) can then be used to validate changes. For example, a two-way authenticated TLS link can be relied upon using an active protocol between a BIOS/EC and a management system as settings are changed. However, this still uses an identity on the platform that should be trusted along with a dynamic management system that is difficult to scale.

According to an example, platform enforced policies that minimize trust in an OS and an OS based local management agent are provided. Accordingly, a secure path back from the underlying platform through to the management system to confirm that management policies have been passed through the OS and reached the underlying platform, such as configured within an embedded controller (EC), is provided. In an example, a secure root back to the management system can be provided using a security processor such as a Trusted Platform Module (TPM) or other secure cryptoprocessor to sign a management state and chain the identity back to the TPM identity within the OS. According to an example, a management status can be signed at each reboot process of the device. According to an example, a management information attestation scheme or management system comprises a platform on an end point device. The management system may have an enterprise management model where settings, policies and a manifest can be specified and signed on a management console. For example, basic input/output system (BIOS) features can be configured and managed when supported by a local administration tool or through the device SCCM.

According to an example, a configuration of the management system is pulled by a management agent which may run on the operating system (OS) of the end point device. The configuration can then be pushed down to firmware, such as the BIOS, by an OS component (or agent) and installed in an EC. The OS component is trusted to correctly push the signed configurations down to the BIOS or EC and confirm that the changes occur correctly. Signing and freshness checks of the configurations ensure that specified policies are accepted at the device. Guarantees of delivery can be based on trust in the local management agent (e.g. SCCM) of the device.

In an example, the attestation scheme or service can be used to route back to a secure microprocessor or trusted platform module (TPM) identity in the operating system (OS) of the local device. In an example, the secure microprocessor can use the attestation scheme to confirm whether the device is verified for use in an enterprise, for example. Encryptions or signatures can be applied to a management status or policy of the system at a particular time and the signed statuses can be used by the attestation scheme to check platform level system configurations such as firmware settings which may be changed after a reboot or after waking up from a sleep mode. This can reduce reliance on an OS-based local management agent on the device to enforce policies, by providing a secure route to a management system (remote to the device in question) that can confirm that any policies have been passed through to the device OS successfully. A device TPM can be used to sign the management state whilst enabling the identity to be chained back to a TPM identity of the device (OS). A deviation in an acceptable device state n be determined and notified as appropriate.

FIG. 1 is a schematic representation of an end point device 100 providing a management system or management server 109 with a trustable management state or signed structure 110 that is generated by firmware 103 at boot time, according to an example. At the firmware (which can be in the form of a BIOS for example) a secure management state is linked to the platform using a cryptographic key. The OS 120 of the end point device is trusted to deliver the management state from the firmware to the management system.

As an end point device or PC 100 boots (or comes out of hibernation for example) a firmware 103 can gather management status information. The management status information may comprise information about system updates which may be gathered from the EC 107. In an example, for individual settings, the firmware 103 may collect such settings. For multiple settings of management data, such as a manifest for example, the firmware 103 may collect a hash of the multiple settings. The hash may include a management state, a manifest hash, and/or recovery variables. The firmware 103 can format each individual setting or hash into a message format that can be parsed and signed (for example, a JSON format) which can include a serial number or other unique identifier.

The firmware 103 can use an appropriate private key or signature key (a first cryptographic key) or a TPM 170 restricted signing key within the platform hierarchy to sign the management status information along with a TPM based time value. The private key may be accessible during a trusted execution state of the device platform. The signed management status information may be referred to as a management statement or signed structure. The TPM based time value may be a monochromatic counter used to demonstrate the freshness of the signed structure, for example to allow the management status information to be checked to ensure to there has been no policy role-back and that updates are enacted within a specified time window. The firmware 103 may perform the following to sign the management status information:

a. The firmware 103 creates a policy for the signing key which can include measurements made by the TPM 170 during the boot up until this point, for example fixed platform configuration registers (PCRs) and the original equipment manufacturer's PCR (OEM PCR).

b. The firmware 103 uses the CreatePrimary TPM command to create the BiosSignKey public/private key pair. This key pair is based on a random seed fixed in the TPM platform hierarchy along with the policy which may include any PCR values, or other data representing evidence of how the key pair is created in the security processor. This ensures that given the same boot conditions the same key pair should be generated within the TPM.

c. This results in the TPM returning a CreationData, CreationTicket and CreationHash data along with a handle to the key.

d. The firmware 103 uses the TPM to obtain a monotonic counter (TpmTime) used to demonstrate the freshness of the signed structure.

e. The firmware 103 then formats a to_be_signed structure based on the state information and the TpmTime.

f. The firmware 103 uses the TPM to sign the to_be_signed structure (both hash it and sign the hash with the BiosSignKey).

g. The firmware 103 may use the same key to perform a TpmQuote to demonstrate the state of the firmware 103 when the information was signed.

h. The firmware 103 then extends the OEM PCR and clears the handle so that the key pair can no longer be available to any other processes.

i. The firmware 103 then packages up two structures and places these packages where they can be picked up by the OS, such as within two user extensible firmware interface variables (UEFI variables). The first structure relates to the signed structure (created in a, d-g) and the second structure relates to information about the signing key (created in b-c):

i. <to_be_signed||TPMTime>|BiosSignPublicKey|| Signature ii. TPM2B_CREATION_DATA||CreationHash|| CreationTicket||BiosKey.KeyPolicy As such, a snapshot of the management state of the device as the device boots (or comes back from a hibernate state) is provided to allow the management system to trust the management state at the last boot. The boot time management state can be used to report a run-time validation public key that can be used to sign additional management information changes as they occur.

According to an example, the management system can build up a database of BiosSigning TPM based public keys (a second cryptographic key) that can be used for other tasks within the firmware 103. The management system can export this information to be used in other enterprise systems.

According to an example, a dynamic protocol can be provided in which the embedded controller directly responds to the management system in order to confirm the changes using the public/private key pair. Trust is established in this key pair. An additional component such as the EC can create a public/private key pair and include the public key in the signed management information. Including this key in the management information structures, and hence linked to the BiosSignKey, can enable trust to be established in this embedded controller key based on trust in the TPM identity.

According to an example, the OS can start a management agent 105 on the end point device 100 which can then pick up the signed structure along with information about the signing key. After the OS has booted and the management agent 105 has run it can pick up the signed packages.

The trusting of the signature may be achieved, in an example, in different ways. For example, a check with keys that are consistent over time can be used, or an identity linked TPM identity generated within the S can be used.

In an example where a check, is made by linking the BiosSignKey to a TPM Identity, the agent 105 has a TPM identity key that it can use to certify the TPM restricted signing key which increases security and allows an enterprise to bind the management status information to an identity provided by the TPM, which can be based on trust in the endorsement certificate added during manufacture of the device for example. If the agent 105 has access to the TPM identity key (used to certify TPM operations) then the agent can use the TPM identity key along with the creation information to certify the creation of the BiosSignKey. A certification of the creation of the BiosSignKey demonstrates that the key comes from a valid TPM associated with that identity. For example, this certification can be done using the CreationTicket, CreationHash and KeyPolicy and BIOSSignKey.Pub and the TPM CertifyCreation Command and returns a TPM_Attest structure. The certification can be done once, or on demand from the management system, and is described as the KeyCertification Structure.

In an example where an identity linked to a TPM identity generated within the OS can be used trust can be based on having the TPM restricted signing key (BiosSignKey) recorded on first use after registration and ensuring the same key is used over the lifetime of the device, which relies on the device being in a 'trusted state' when first registered.

The management agent 105 can send the signed structure 110 to the management system 109. That is, the management agent 105 packages up the signed management information along with any KeyCertification Structure that is then sent to the management system 109.

The management system carp then check that the reported information matches the expectations. In an example, the management system 109 receives the signed structure or packages from the management agent 105. The "Find Non-conformant devices" module 160 can look for devices that have not received recent signed management data and can alert 165 an administrator. According to an example, updates may not work and management information is not returned. For example, this could be because the device is broken, turned off or the management system has been subverted such that the administrator can be prompted to investigate.

The management system or management component(s) can use the information in the signed structure to detect potential issues or threats. According to an example, the management system can check the signature applied to the management status information using policy information stored in a database 145. The management system can check the TPM identity of the device providing the information by checking the signatures on the management status information return messages. The identity certificate can be stored in a device identification database 150. In an example, an alert can be generated if a signature or other information is incorrect, such as for example when a management status of the device does not correlate with a state of the cryptoprocessor at the time of signing the device structure. According to an example, the management system can respond to an absence of information, for example where a validated signed management data structure is not received, for example during the boot/reboot process. The management system can validate or check that the status of the public key used to sign the management information is correct. Some examples are now described.

a. According to an example, the device is a new device: the receiving system records the public key against the TPM identity. If there is a KeyCertification structure the validation module can validate the key against the identity certificate and record that this has happened (see point c below). The management system can check that this device is expected to be newly provisioned and hence for a new identity to be created.

b. According to an example, the signed management data comes with a public key: the management system checks that this key is the expected key for the system. This may be achieved using any serial number included in the message and the TPM identity. If the key is the same as has been used in the past the key is trusted, otherwise an alert is generated.

c. According to an example, if the device has a KeyCertification structure: perform step b above and the management system can validate that the KeyCertification structure is correctly signed and that the identity is guaranteed by an identity certificate issued to the TPM (or other identity mechanism), The validation may check the key policies and/or that the OEM PCR has an expected value as specified by the firmware manufacturer.

d. According to an example, if there is TPM quote information then any quoted PCR values can be checked against expected values.

The signed management information can be checked against the current and recent policies. According to an example, the device status can be stored in a device state database 155. The signed management information can be considered acceptable if there has been no policy role-back and/or that updated policies are enacted within a specified time window. The management system can check the state against a recorded state corresponding to the time of signing (i.e. a previous or known state). If a correspondence is found the state is considered acceptable, otherwise the management system can alert or flag one or more issues to the administrator. In an example, alerts can be generated where information is not correct. According to an example, this can deal with a threat such as where a policy or policies are not correctly delivered and/or where a device is 'stuck' in a different state. The management system can log the state (or configuration, i.e. management status information) of the system at the time of signing, which may be recorded in the device state database.

According to an example, there is a management module 160 which can scan a status database to look for one or more end point devices having no recent update information that could indicate that those devices are at risk.

According to an example, a management system can be provided with a signed structure from the local device using a protocol. As the client de boots it can look at the configuration state as recorded within the EC. In an example, the firmware (at boot time) can use a TPM signing key created within the TPM's platform hierarchy to sign the state information, where the signed information can then be relayed back to the management system. The management system can trust that the signing keys are valid to sign the state.

According to an example, a management attestation statement can take the form of a formatted list of all the configuration parameters. It can include everything that comes from the various GetStatement commands and can include a hash of a policy information stored within the platform for use there or within the OS along with a hash of additional data associated with the enforcement of such policies. For example, this may be an ASN.1 format, or JSON or some arbitrary format that can be parsed by the validation system.

According to an example, the management system can look at attestations over time starting, with one a first attestation happening when the management system first provisions the device being managed. The first attestation after provisioning can record that this is an initial provisioning and each statement provides the attestation of the public key. The public key used can be recorded and checked for each management attestation statement. Trust can be established through continuity of the public key being used to sign the attestation statements. As such, there exists a status where the client device is trusted as provisioning happens.

According to an example, there is provided a certified attestation process. The TPM can have a certified identity key that is provisioned via a privacy certificate authority (CA). The key can be linked such that it can be used to sign the management attestation status to the endorsement certificate associated with the client device. Access to the endorsement authorization can be provided to create an identity key, which may be linked with a main ownership hierarchy and/or controlled by a user. This can prevent the ability to create an identity for the signing key in the platform hierarchy. The key can be created and the creation ticket can be relayed to the management agent. The management agent can be provided with access to a TPM Identity key (AIK) that has been certified by a privacy CA and has an associated certificate. This identity key can be used to sign a key creation attestation statement which confirms that the key has been created by the TPM that the identity key is associated with. The management agent can report the PCR status and confirmation that the key was created within the platform hierarchy to the management system. With this certified attestation confidence that the signed management attestation statement is genuine can be given. Examples of a trust statement may include:
   a. The BiosSigning key is created by the same TPM as an attestation identity key (AIK) which links to the endorsement certificate.
   b. The BiosSigning key is created within the platform hierarchy which is locked such that only firmware commands can access the key.
   c. The BiosSigning key was created when PCRs were in a given state. The BIOS vendor can make a statement of the hash at the point of signing and which will be changed afterwards before the OS boot. This confirms that the signing happens during boot.

Figure 2:
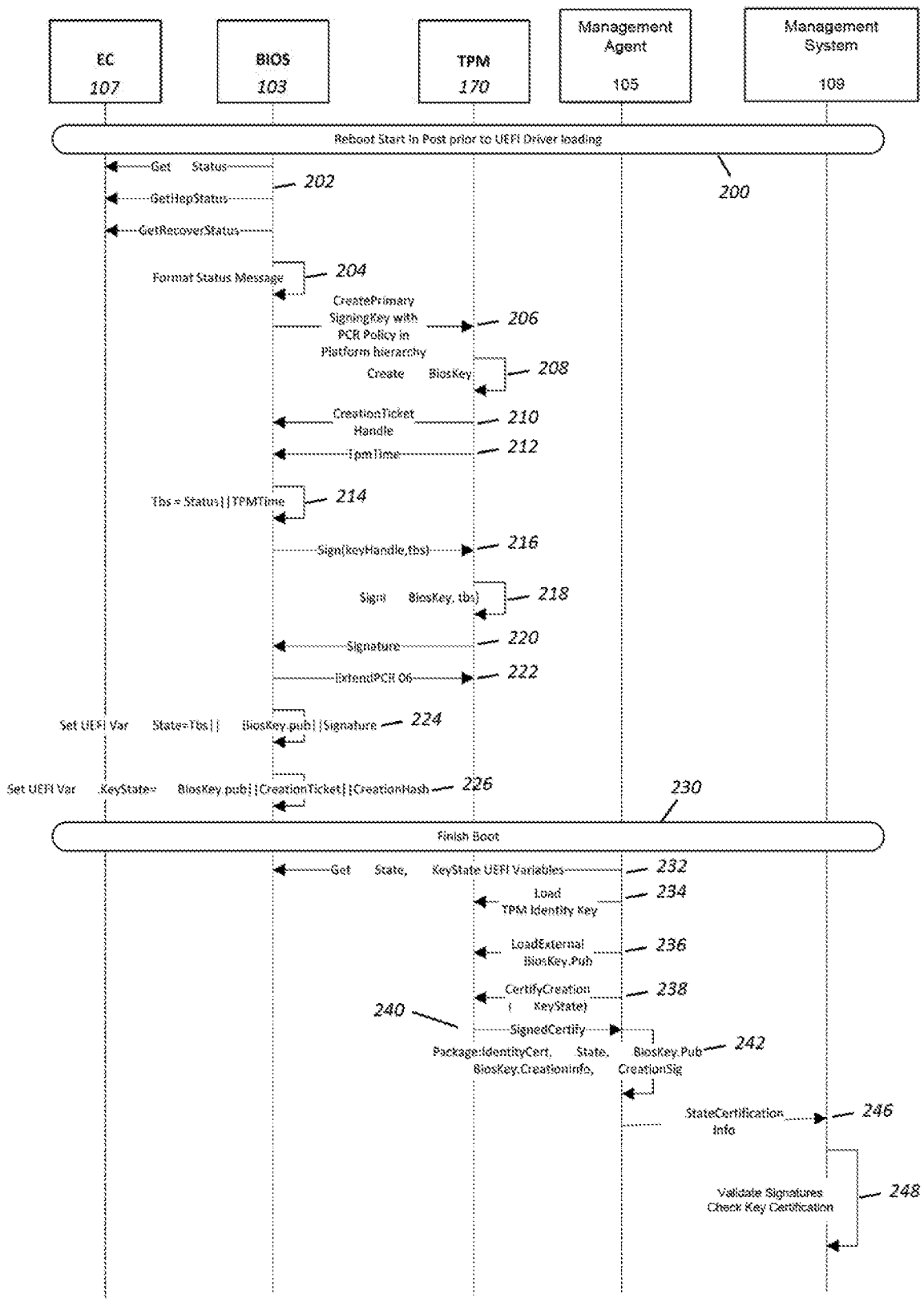
FIG. 2 shows the flow of information at the different protocol steps when providing a management system with a management state according to an example.

FIG. 2 shows the flow of information at the different protocol steps when providing a management system 109 with a signed structure. The protocol starts 200 during the POST boot stage which may be before the loading of any third party UEFI drivers.

The firmware 103 can obtain 202 the device management state from the EC 107. Irk an example, this may be achieved using status calls that support status II calls as specified in recovery firmware specifications. This can involve obtaining the Sure Run state, the Sure Run manifest hash (it not in the Sure Run state) and the Sure Run data state, the Sure Recover variables, and/or any other state for additional features.

The firmware can format the management status message into a defined form that can be parsed and signed 204.

The firmware can create 206-208 a TPM signing key pair (public and private key) (BiosKey). The firmware may initially create a policy for the key pair which can include any fixed PCRs and the OEM PCR. This can lead to the creation f a key that is based on particular PCR values and the hierarchy seed such that the same key cannot be created when there are different PCR values. The firmware can use CreatePrimary to create a signing key pair within the platform hierarchy with the policy and a pre-chosen authorisation, for example using the platform hierarchy authorisation. The key can be created to report any fixed PCRs along with the OEM PCR in the creation ticket, which can be different from the policy and is specified in the CreatePrimary call. The TPM 170 can then return a handle to the key along with a TPM2B_CREATION_DATA structure, a CreationHash and a Creation Ticket.

The firmware can use the TPM to get the <creation ticket and handle to the created (BIOSKey) key pair and a Tpm-Time 210-212 which may be a monotonic time-based counter that is used to ensure that the signed attestation is fresh, for example.

The TpmTime can be appended 214 to the status message to form a to_be_Signed_message.

The firmware can use the TPM to sign 216-218 the to_be_Signed_message. According to an example, the firmware can use the TPM (or TPM Library) to create a hash of the To_Be_Signed message. The firmware can use the TPM to sign the hash using the (BIOSKey) key handle (and pre-chosen authorisation).

The TPM can sign the message 220 and returns the signing to the firmware.

The firmware can use the TPM to extend the OEM PCR 222 and flush the (BIOSKey) key handle. This can prevent another component from creating or using the signing key. According to an example, the key remains usable whilst the key is within the TPM. In an example, flushing the handle removes the key. According to an example, the key may not then be recreated due to the PCR policy.

The firmware can format 224 the signed message in the form: To_Be_Signed_Message||BiosKey.Pub||Signature.

The formatted signed message structure can be placed 226 into a UEFI variable where it can be picked up from the OS. The firmware can format the key creation information. In an example, the signing key can be verified. The formatted signed message may take the form of a message containing: TPM2B_CREATION_DATA||CreationHash||Creation Ticket||BiosKey.KeyPolicy. This structure can form the attestation structure. According to an example, the attestation structure is placed into a UEFI Variable where the OS can pick up the data. The key policy may be a hash of the policy under which the BiosKey was created. In an example, the attestation structure can be used to validate a creation ticket. In an example, the attestation structure includes a leaf node with the controlling PCRs. The attestation structure allows the key to be certified, for example to demonstrate that the key comes from the TPM on the device. In an example, the attestation structure provides the state of selected PCRs at creation time.

The reboot can continue until it is finished 230.

When the reboot is complete 232, the management agent 130 (e.g. WMI management or Windows WMI Driver) can continue. According to an example, the management agent can pick up the signed message and relay this to the server of the management system. The management system may then check the signing, that the clock is greater than the previous value and/or that the key has not changed. According to an example, there is a certified attestation protocol where the management agent can pick up the signed statement and the BiosKey.Public is extracted from this message. The creation certification information can be parsed and can be split into different components with TPM binary structures recreated. This process can provide:
   a. The BiosKey.Public Key
   b. The BiosKey.Policy
   c. The creation ticket for BiosKey
   d. the creation Hash for BiosKey
   e. The creation data structure for BiosKey. This can include (i) the PCR selection specified in CreatePrimary and the digest of that selection. Valid digest values at key usage time prior to the extension of the PCR can be provided by the enterprise; (ii) the locality; (iii) the parentName, Algorithm and Qualified Name, where the name can be the platform hierarchy handle which can ensure that the key is created and used in the TPM platform hierarchy under control of the TPM; and (iv) any other information.

The management agent can access 234 a TPM Identity Key within the storage hierarchy. The key may be loaded or created using CreatePrimary to match the certificate. This operation follows the standard way of getting an identity key for a TPM using an endorsement certificate and privacy CA The management agent can use 236 the TPM Load External command to load the BiosKey.Pub along with the policy hash to the null hierarchy. According to an example, this can give a valid public key with the same name as when created in the firmware.

The local management agent can use 238 the CertifyCreation TPM command to obtain the TPM, to certify that the TPM created the BiosKey and under the conditions specified within the CreationData structure. According to an example, the following information can be used for this certification process:

a. The CreationHash (which is the hash of the creationdata structure).
b. The CreationTicket which is an HMAC using the TPM's internal proof key.
c. A handle to the loaded BiosKey.Public with the correct name (hence the creation policy).
d. A handle to the TPM Identity Key.
e. The authorisation for the identity Key.
f. The command can then return 240;
    i. A TPM_Attest structure containing the CreationData and the BiosKey name.
    ii. A signature on the hash of this structure.

The management agent can create 242 a package containing: (i) the Signed State from the firmware; (ii) the TPM_Attest structure and signature; and (iii) the certificate of the TPM_Identity Key.

The package can be sent 246 to the management system.

The management system can verify 248 the package state. According to an example, the management system checks the state is as expected by checking that the TPMClock time in the signed state is later than the attestation package (246) received from the device from a previous boot cycle. The management system may check that the signing public key is the same previous (246) messages from the device. According to an example, the management system can check that the TPM Identity key is from the device it expects by checking that the Creation data is correctly signed by the identity key and/or that the Creation data shows a platform key that was created under the right PCR states and/or using the right policy. These statements can allow the management system to trust that the state of the end point device is from the given device and that it reflects the state held in the EC at boot time.

According to are example, the Bios key can be a restricted key that can be used to check that local management keys are created within the TPM. In an example, if this is the case then the data structure being signed is hashed using the TPM, with the ticket being returned to demonstrate this. This can ensure that the signing key which signs the TPM structures cannot be forced to sign a non-TPM structure.

According to an example, there can be an identity key that has been issued with an identity certificate in such a way that an enterprise can link it to the physical device. For example, a privacy certificate authority (CA) may be run or linked to the physical device. According to an example, the protocol is follows:
a. On the client device a key can be created under appropriate policies and its name generated.
b. The name along with the Endorsement certificate can be sent to the Privacy CA (which may be a management plugin).
c. The Privacy CA can encrypt a TPM identity certificate with an AES key and encrypt the AES key using the public key in an endorsement certificate.
d. On the client the TPM identity certificate can be decrypted using the ActivateCredential command via access to the endorsement hierarchy.

According to an example, a runtime attestation of status information is provided using a public/private key pair. The key pair can be kept secure and used within a safe place. The public key can be trusted by the management system as a key created for this purpose from the specified device by including it in the "To_Be_Signed" attestation message. Trust is derived from the TPM signature. Such keys can also be used to deliver encrypted data down to the platform. According to an example, on the EC an asymmetric key pair can be created where the public key can become part of the configuration state. The public key may be certified at boot time with a certification process protocol, for example such, as that described with reference to FIG. 2. The protocol can provide the management system with a link between the endorsement certificate (or platform key) and the keys within the EC to establish trust. The EC key pair may then be used to sign state information on request. According to an example, after a policy change a request can sign the state variables where the EC may perform the signing and the signed package can be returned to the management system.

According to an example, specific packages encrypted for the EC can be delivered with password information, for example for establishing services. In an example, the information can be encrypted with a key (e.g. an advanced encryption standard key or AES key) which itself can be encrypted using the EC's public key. The EC can decrypt the AES key and then the whole package.

According to an example, the method and system described herein may, be used for other platform state information such as the state of firmware settings or the state of settings associated with other attached devices.

The method and system described herein can ensure that the EC becomes the root of trust for the management system, which can allow the management system to trust that policies are correctly received and processed by client devices. This can reduce or remove a dependency upon trust in the operating system of the local device.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 3:
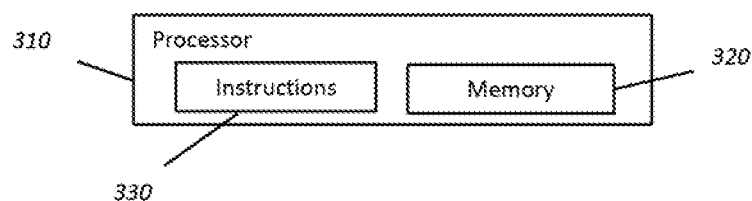
FIG. 3 shows a processor associated with a memory and comprising instructions for providing a management system with a trustable management state according to an example.

FIG. 3 shows n example of a processor 310 associated with memory 320. The memory 320 comprises computer readable instructions 330 which are executable by the processor 310. The instructions 330 comprise instruction to, at least create a data structure and a first cryptographic key at a secure cryptoprocessor (security processor) of the device platform, sign the data structure using the first cryptographic key, wherein the signed data structure represents a device management status and a time-based value from the secure cryptoprocessor, and transmit the signed data structure to a management system via a management agent of the device platform for verification of the signature applied to the signed data structure and checking of the time-based value.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been de cri bed with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any, dependent claim may be combined with the features of any of the independent claims or other dependent claims.

The invention claimed is:

1. A device platform comprising a security processor:
the security processor to generate signed data and a counter value,
wherein the signed data is generated by signing data representing a management state obtained from an embedded controller,
wherein the signing is performed using a signature key from a cryptographic key pair created and managed in the security processor, the signature key being accessible during a trusted execution state of the device platform; and
a management agent to enforce data changes to the device platform,
the device platform to provide the signed data to a management system via the management agent of the device platform and to check the counter value for verification of a signature applied to the signed data.

2. The device platform as claimed in claim 1, the security processor further to:
provide data representing evidence of how the key pair was created in the security processor, and linked to a boot process.

3. The device platform as claimed in claim 1, the management agent to:
use a certified identity within the security processor to validate that the signing key was created in the security processor.

4. The device platform as claimed in claim 1, the security processor further to:
provide a handle to the signature key, and a time-based value to a firmware of the device platform.

5. The device platform as claimed in claim 1, the management agent further to:
query a firmware of the device platform for a device platform state.

6. A non-transitory machine-readable storage medium encoded with instructions executable by a processor for attesting to a management status of a device platform, the machine-readable storage medium comprising instructions to:
create a data structure and a first cryptographic key at a secure cryptoprocessor of the device platform;
sign the data structure using the first cryptographic key, wherein the signed data structure comprises a management state obtained from an embedded controller and a time-based value from the secure cryptoprocessor;
transmit the signed data structure to a management system via a management agent of the device platform for verification of the signature applied to the signed data structure and checking of the time-based value.

7. The non-transitory machine-readable storage medium as claimed in claim 6, further encoded with instructions to:
provide data representing evidence of how the first cryptographic key was created in the secure cryptoprocessor of the device platform, and linked to a boot process.

8. The non-transitory machine-readable storage medium as claimed in claim 6, further encoded with instructions to:
use a certified identity within the secure cryptoprocessor to validate that the signing key was created in the secure cryptoprocessor of the device platform.

9. The non-transitory machine-readable storage medium as claimed in claim 6, further encoded with instructions to:
certify the first cryptographic key at the management agent.

10. The non-transitory machine-readable storage medium as claimed in claim 6, further encoded with instructions to:
provide a handle to the signature key, and time-based value to a firmware of the device platform.

11. The non-transitory machine-readable storage medium as claimed in claim 6, further encoded with instructions to:
query a firmware of the device platform for a device platform state.

12. A management system comprising a validation module, the validation module to:
receive a signed data structure from a device, wherein the signed data structure comprises a management state obtained from an embedded controller on the device;
validate the signed data structure using a cryptographic key;
validate the status of the cryptographic key;
record a management status of the device to which the signed data structure relates; and
compare the device management status against a state of a cryptoprocessor in the device at a time of signing the data structure.

13. The management system as claimed in claim 12, further to generate an alert when the device management status does not correlate with the state of the cryptoprocessor at the time of signing the device structure.

14. The management system as claimed in claim 12, further to generate an alert when a validated signed management data structure is not received.

15. The management system as claimed in claim 12, further to:
  receive data representing a management state of the device; and
  validate a signature used to sign the management state data.

\* \* \* \* \*